Sept. 19, 1933.   F. KRCZIL   1,927,459
PRODUCTION AND REACTIVATION OF ACTIVE CHARCOAL
Filed Feb. 1, 1933
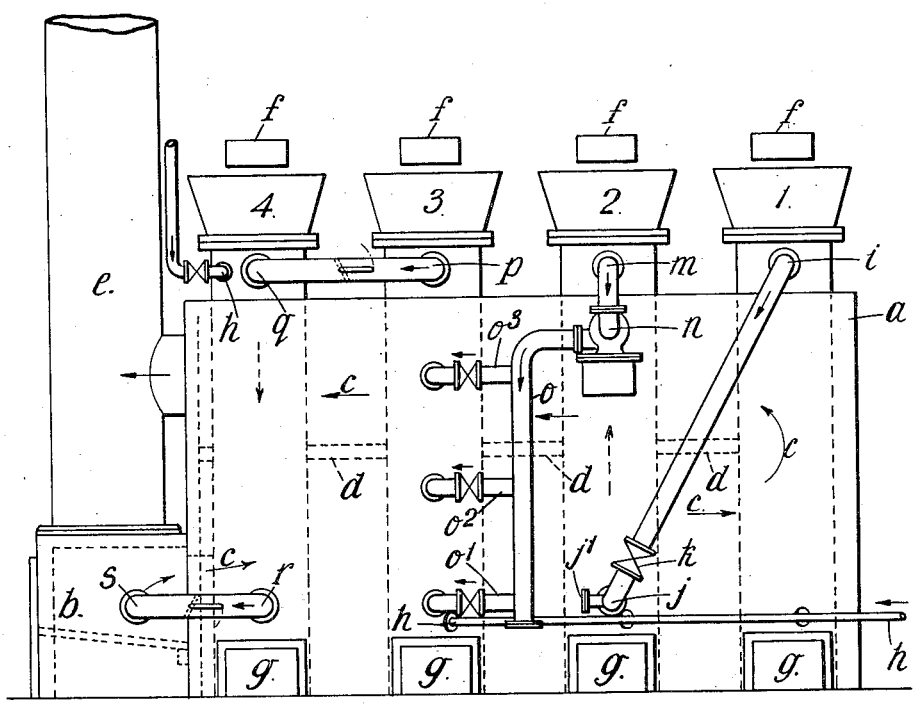
Inventor
F. Krczil
by [signature]
Atty.

Patented Sept. 19, 1933

1,927,459

UNITED STATES PATENT OFFICE 1,927,459

PRODUCTION AND REACTIVATION OF ACTIVE CHARCOAL

Franz Krczil, Aussig on the Elbe, Czechoslovakia

Application February 1, 1933, Serial No. 654,674, and in Czechoslovakia January 4, 1932

7 Claims. (Cl. 252—3)

This invention relates to an improved process for the production of active carbon or charcoal by the treatment of carbonaceous material with activating gases in activating chambers or retorts at suitable temperatures. Such active carbon or active charcoal is used for purposes of decoloration, adsorption and in catalytic processes. By carbonaceous material is to be understood any of the usual sources of organic or like material for the production of active carbon as well as spent carbon, which after use has lost its active properties and by treatment by my process may be reactivated. By the term activating gases is to be understood all known gases or mixtures used for this purpose, such as any of the following or mixtures thereof: carbon-dioxide, superheated steam, chlorine or gases containing some uncombined oxygen.

The process of activation is carried out in retorts or chambers which may be vertical, inclined or horizontal and either stationary or rotating and such chambers may be heated by external flues or internally. The raw material to be activated enters at one point or end of the retort or chamber and passes out in the form of active charcoal at the other end and the chamber is maintained near the discharge end at the temperature of activation while the entering raw material is at substantially room temperature.

It is known to produce active charcoal on the counterflow principle in which the organic substance to be activated is passed in one direction through the activating chamber and the activating gases are passed in the reverse direction. The process of activation converts the activating gases into combustible gases which are discharged at the cool end of the chamber. The calorific value of these discharged gases is low owing to the water taken up by these gases in the course of their passage, more particularly during the later stage of such passage.

To overcome this objection it has been proposed to treat the raw material in two stages. In the first stage the organic substances to be activated were dried or de-hydrated and in the second stage the de-hydrated mass was brought to the temperature of activation and subjected to the action of the activating gases. A satisfactory degree of separation of the moisture from the discharged combustible gases resulting from the activation process is only possible when this two stage process is carried out in separate chambers for each stage. This involves discontinuity which complicates both the process and the plant required to carry it out.

Attempts have been made to effect in a continuous process the separation of the moisture extracted from the raw material and the discharged combustible gases. Thus in a vertical retort two gas withdrawal ducts were introduced at different heights thereby dividing the retort chamber into two sections. In the upper section the drying or de-hydrating process was effected and from this section the uppermost withdrawal duct removed the extracted moisture. In the lower chamber were the zones of activation proper and from the upper end of this lower section the combustible gases produced during the process of activation were withdrawn. It is found that effective separation of the moisture and combustible gases is impossible even in the most favourable conditions when the raw material supplied to the plant always has the same or substantially the same moisture content. In the activating chamber the temperature during working varies within considerable limits and this produces a continual variation in the heights of the zones of activation and drying. The distance apart of the two withdrawal pipes was, however, constant, so that a considerable dilution of the combustible gases by the moisture or on the other hand the escape of the combustible gases with the moisture occurred at frequent intervals and the resulting thermal efficiency of the plant was materially reduced.

These losses are still more marked when, as is invariably the case in commercial practice, the raw material to be activated is of varying moisture content. Owing to the fixed relation of the combustible gas outlet to the outlet for the water vapour, the raw material, when its moisture content is great, is not properly de-hydrated before it enters the activation zone and under those circumstances the discharged combustible gases are highly diluted with steam even when special measures are taken to preserve constancy of temperature in the activation zone. When the moisture content of the raw material is low, loss of combustible gas through the vapour outlet takes place and the use of this gas for heating purposes is thus lost.

This method of operation has still one further important disadvantage. Owing to the withdrawal of the hot combustible gases before these pass through the cooler moist layers of raw material, the drying out of this material is effected in the main by the heat radiated from the retort walls. The partially carbonized material, which naturally forms most rapidly near those walls, is a bad conductor of heat so that there is always a tendency for the core or central part of the advancing column of raw material to be more slowly dried than the circumferential portion. Generally it is found that from ¼ to ⅓ of the entire retort is taken up with drying whereby the capacity of the retort to effect activation is materially reduced. For the reasons stated, the separation of the functions of drying and activation in the manner described does not avoid the objections of the ordinary counter-flow process set forth above but even entails additional drawbacks which materially decrease the thermal efficiency of the plant.

It is the object of the present invention to avoid the difficulties and objections discussed above and to effect a material improvement in the thermal efficiency and the rate of throughput of the methods hitherto adopted for the production of active charcoal.

In the process according to this invention, carbonaceous material is passed in one direction through a chamber from a feeding to a discharge end thereof while the chamber is heated to give an increasing temperature of the contents from the said feeding to the discharge end and activating gases are introduced at the hotter end of the chamber and discharged at the cooler end so that such gases first activate the carbonized material in the hottest zones and then assist in drying and carry off the moisture from the raw material introduced at the feeding end of the chamber, the moisture laden discharged gases being passed to a glowing layer of carbon to subject them to endothermic reactions and convert the contained moisture into a fuel gas which is subsequently burnt for heating purposes.

A further feature of my improved process consists of supplying an excess of steam with the activating gases over that required for complete activation, which excess together with the steam resulting from de-hydration of the raw material, passes with the discharged gases through the layer of glowing charcoal to be converted by the well understood endothermic reactions into water gas. By employing an excess of steam in this manner the rate of throughput of the raw material may be increased without any sacrifice in the thermal efficiency of the plant.

In carrying the invention into effect the discharged gases from an activating chamber working on the counterflow principle are passed to the bottom side of the grate of a generator. This may for instance be the grate of the auxiliary furnace used for heating up the activating chamber. The gases are introduced below the grate or at an intermediate point in the fuel layer and not into the combustion space over the grate as has been done hitherto. In all cases the depth of the layer of glowing fuel through which the gases pass must be adequate to effect the conversion of the contained moisture into water gas. It will be readily understood that there are very many ways in which the discharged moisture laden gases may be treated in accordance with this invention in order to convert their moisture content into water gas and I shall now describe a few forms, some of which present additional technical advantages to those discussed above.

Thus I may pass the discharged moisture laden gases from one chamber to a second activation chamber. The introduction of these gases into the second activation chamber may be effected at the inlet or the discharge end for the material to be activated or at any desired intermediate point and the gases discharged from the first activation chamber, may, before introduction to the second chamber, be mixed with air or oxygen for the complete or partial combustion of these gases and in some cases activation material may be added. The introduction of these gases from the first to the second activation chamber may take place at a plurality of points or zones in the second chamber and the addition of air or the like and of supplementary activating gases may take place at different selected points of such plurality. In this way the range and flexibility of control of the entire plant is materially increased to suit widely varying raw materials or raw materials with widely varying moisture content, while the maximum degree of thermal efficiency is, under all these varying conditions, secured. When working a battery of several retorts or activating chambers, it will be readily understood that the discharged moisture laden gases from several chambers may be led to a single chamber of the battery or conversely the discharged gases from a single chamber may be distributed among several other chambers or retorts. Also in some cases the discharged gases from one or several activating chambers may be passed through another activation chamber in the same direction as the material to be activated passes therethrough, that is to say the discharged gases in this case would be introduced to the last mentioned chamber at or near the filling hopper. In this case the moisture laden gases pass through the glowing charcoal in the activating chamber which thus also acts as a generator to convert the whole of the contained steam into water gas. The gases discharged from this uni-directional flow activating chamber are in a state ready to be used for heating purposes in a suitable combustion chamber or furnace and may be distributed as desired among the retorts of the battery. The retorts or activating chambers employed are in all cases of elongated form and the cross section is such that the activating gases are brought effectively and uniformly in contact with the organic material fed through the elongated chambers from the inlet end to the discharge end from which the active charcoal is removed in any suitable and well known manner.

By introducing the gases discharged from one activating chamber working on the counter-flow principle to a second activating chamber, the vapour content of such discharge gases acts as an activating agent in the second chamber so that only a supplementary supply of steam need be added, the quantity of this supplementary supply being preferably so adjusted that there is an excess of steam present over that required for complete activation of the organic material. This constitutes an important feature of this invention. Hitherto the presence of an excess of steam over that required to effect complete activation of the organic material was avoided as such an excess produced a reduction in the thermal efficiency of the plant. According to this invention, however, the steam extracted from the raw organic material as well as any excess carried over by the discharged gases from the activating zones to the drying zone is all at a later stage converted into water gas and tends to increase rather than decrease the thermal efficiency and thus the presence of an excess has no disadvantageous action. By employing an excess of activating steam the rate of throughput in the activating chamber is increased and consequently its productivity.

By adding air or any other oxygen containing gas to the discharged gases from one activating retort before they enter the next in a series or battery, these gases, on entering the hot activation zone are ignited and burn to supply the carbon dioxide for activation. There is thus an additional economy and simplification possible by means of this invention when it is applied to a battery of retorts or activating chambers arranged to operate in series in the manner herein described. It follows from the above that when working with a battery of activating retorts, the most advantageous method is to operate the retorts in series so that the gases discharged from the first retort working on the counterflow principle are passed to the second retort also working on the counter-flow principle and for which they form part at least of the activating gases. The final retort of the battery is worked on the uni-directional principle and the gases discharged therefrom are employed in heating the other retorts.

It will also be understood that suitable fans or pressure boosters may be introduced preferably in the discharge pipe from the retort for the purpose of drawing or forcing the gases along the paths herein set forth. It is also preferable that the retorts or activating chambers should be arranged vertically or substantially vertically so that the organic material is fed by a gravity action from the top to the bottom while the activating gases pass through the chamber in an upward direction.

The accompanying drawing shows in side elevation a battery or bench of retorts, four in number, arranged for the production of active charcoal or the re-activation of charcoal in accordance with this invention. In the drawing the retorts are numbered, 1, 2, 3 and 4 and are shown as arranged vertically in a brick structure $a$ through which the heating gases from an auxiliary furnace $b$ pass, first over the lower ends of the retorts and in a return pass over the upper ends as indicated by the arrows $c$. Suitable baffles $d$ are arranged within the brick structure $a$ to guide the heating gases in the path shown from the furnace $b$ to the stack $e$. The raw organic material to be activated is supplied to the upper ends of the retorts, 1, 2, 3 and 4 by conveyors or the like $f$, and in the process of activation, this material passes downwards through the retorts to be extracted by suitable means through the doors or openings $g$. Activating gases, which may, for example, be steam or carbon-dioxide or a mixture of these, are supplied by the pipes $h$.

In the case of retorts 1, 2 and 3, the pipe $h$ enters the lower hotter part of the retort so that the gases pass upwards in a counter direction to the downward movement of the raw organic material to be carbonized and activated: hence the name "counter flow" principle herein given to activating retorts working in this manner. In the case of the retort No. 4, the activating gases enter at $h$ in the upper part of the retort, that is at the same end as the raw material, both of which thus pass downwards through the retort and hence this retort is herein described as working on the "uni-directional" principle.

The activating gases entering at $h$ at the lower part of retort No. 1, pass upwards first through the hottest zones of carbonized material in this lower part of the retort and are thereby brought to a high temperature and in the process of activation are converted into water gas and "CO", which are valuable combustible gases. In the upper part of the retort, the raw material, entering at room temperature, is dried or freed of its moisture content and the initial stages of carbonization take place. In these processes, the gases from the main hot activation zones of the retort are cooled and a considerable quantity of vapour is added to them. In giving up heat to the raw material in the upper zones of the retort, these gases considerably accelerate the drying and preliminary carbonization processes and tend to prevent the formation of a wall of partially carbonized material near the outer walls of the retort and a central core of moist material or material at a less advanced stage of carbonization.

It will be readily understood that from the outlet $i$ at the upper end of the retort No. 1, there emerges a mixture of combustible gases and water vapour at a moderate temperature and in accordance with this invention this mixture passes to a layer of glowing charcoal. As shown the mixture from the outlet $i$ enters at $j$ into the lower hot zone of the second activating retort No. 2 and a suitable valve $k$ may be provided for controlling this flow. An air inlet slide $j'$ may be provided to allow of air for combustion being added to the mixture passing into the retort No. 2 at the inlet $j$. The water vapour in the mixture entering at $j$ is very rapidly converted into water gas by contact with the glowing charcoal in the lower activation zone of the retort No. 2. The air admitted at the slide $j'$ along with the mixture supplies the air for whole or partial combustion of the gases, so that the material in retort No. 2 is heated both internally and externally. The upper zones of retort No. 2, are in the same way as in the case of retort No. 1, drying and preliminary carbonizing zones and again as in the case of retort No. 1, there emerges from the outlet $m$ a mixture of valuable combustible gases and water vapour. A gas booster $n$ is conveniently introduced at this point and this booster $n$ delivers to a downpipe $o$ having three branches $o^1$ $o^2$ and $o^3$ which enter the retort No. 3 at different heights. By controlling the valves shown in these three branch pipes, a very complete temperature control may be effected in the retort No. 3. In this case the gases resulting from activation are passed from the outlet $p$ at the upper end of retort No. 3 to the inlet $q$ at the upper end of retort No. 4, through which they pass downwardly to the outlet $r$. In passing through the glowing charcoal in the lower activating zones of the retort No. 4, the moisture content is all converted into water gas so that there emerges from the outlet $r$ valuable combustible gases at a high temperature. These are shown as passing by the inlet $s$ to the combustion chamber of the auxiliary furnace $b$ where they assist in heating the retorts 1, 2, 3 and 4 externally.

I claim:

1. The process for the production of active charcoal which consists in passing organic material through an elongated chamber in one direction, passing activating gases, including an excess of steam over that required for activation, in the other direction through the entire length of said organic material, heating said chamber, passing the discharged gases through a layer of glowing fuel containing carbon and subsequently burning said gases for heating purposes.

2. The process for the production of active charcoal which consists in passing organic material through an elongated activating chamber in one direction, passing activating gases through said chamber in the other direction whereby said gases effect activation and drying of said organic material, heating said chamber, passing said moisture laden discharged gases from said elongated activating chamber to the activating zone of a second activating chamber, supplying supplementary air and steam to said activating zone of the second activating chamber, discharging the gases from the gases issuing from the cooler end of said second activating chamber into a layer of glowing charcoal and then burning said gases in a furnace.

3. The process for the production of active carbon which consists in passing carbonaceous material through a chamber in one direction from a feeding end to a discharge end thereof, heating said chamber to a progressively increasing temperature from the feeding to the discharge end, passing activating gases through said chamber from the hotter to the cooler end thereof so that said gases first activate the carbonized material in the high temperature zones and then remove the moisture from the carbonaceous material in the zones of lower temperature, passing the moisture-laden gases discharged from the chamber to a glowing layer of carbon to subject the same to endothermic reactions, and convert the contained moisture into a fuel gas, and subsequently burning the gases so treated.

4. The process for the production of active carbon which consists in passing carbonaceous material downwardly through an elongated and substantially vertical chamber, heating said chamber to a progressively increasing temperature from the upper to the lower end thereof, passing activating gases upwardly through the length of said chamber to activate the carbonized material in the lower part thereof and remove moisture content from material in the upper part thereof, subjecting the moisture-laden gases discharged from said upper end to endothermic reactions in the presence of glowing carbon, and burning the gases so treated.

5. The process for the production of active carbon which consists in passing carbonaceous material through an externally heated activating chamber from a feeding to a discharge end thereof, passing activating gases through said chamber from the said discharge to the feeding end thereof, said gases first activating the carbonized material in said chamber and then removing the moisture from the material in the neighborhood of the feeding end thereof, discharging said gases to the feeding end for carbonaceous material of a second activating chamber, supplying activating gases to the feeding end of said second activating chamber, discharging said gases from said second activating chamber at the discharge end thereof for activated carbon, and subsequently burning said discharged gases from said second activating chamber.

6. The process for the production of active carbon which consists in passing carbonaceous material through an externally heated activating chamber from a feeding to a discharge end thereof, passing activating gases through said chamber from said discharge to the feeding end thereof, said gases first activating the carbonized material in said chamber and said gases then removing the moisture from the material in the neighborhood of the feeding end thereof, discharging said gases in controlled proportions to various points in the length of a second activating chamber with a feeding end for carbonaceous material and a discharge end for activated carbon, said second chamber having a gas discharge at its feeding end for carbonaceous material and subjecting the gases discharged from said second activating chamber to endothermic reactions in the presence of glowing carbon to convert the contained moisture to a fuel gas, and burning the gases so treated.

7. The process for the production of active carbon which consists in passing carbonaceous material through an externally heated activating chamber from a feeding to a discharge end thereof, passing activating gases through said chamber from the discharge to the feeding end thereof, said gases first activating the carbonized material in said chamber and said gases then removing the moisture from the material in the neighborhood of the feeding end thereof, discharging said gases to the discharge end of a second activating chamber to subject these gases to endothermic reactions and convert the contained moisture into a fuel gas and supplying air or uncombined oxygen to said second activating chamber to effect combustion of said gases discharged from the first mentioned activating chamber to counterbalance said endothermic reactions and heat the second activating chamber internally.

FRANZ KRCZIL.